(12) United States Patent
Geiselmann et al.

(10) Patent No.: US 12,055,757 B2
(45) Date of Patent: Aug. 6, 2024

(54) OPTICAL MODE-SIZE CONVERTER

(71) Applicant: LiGenTec SA, Ecublens (CH)

(72) Inventors: Michael Geiselmann, Ecublens (CH);
Michael Zervas, Ecublens (CH);
Davide Sacchetto, Ecublens (CH);
Anton Stroganov, Ecublens (CH)

(73) Assignee: LiGenTec, SA, Ecublens (CH)

( * ) Notice: Subject to any disclaimer, the term of this patent is extended or adjusted under 35 U.S.C. 154(b) by 311 days.

(21) Appl. No.: 17/438,843

(22) PCT Filed: Mar. 13, 2020

(86) PCT No.: PCT/EP2020/056935
§ 371 (c)(1),
(2) Date: Sep. 13, 2021

(87) PCT Pub. No.: WO2020/187777
PCT Pub. Date: Sep. 24, 2020

(65) Prior Publication Data
US 2022/0155522 A1 May 19, 2022

(30) Foreign Application Priority Data
Mar. 15, 2019 (GB) .................................... 1903574

(51) Int. Cl.
*G02B 6/14* (2006.01)
*G02B 6/12* (2006.01)
*G02B 6/122* (2006.01)

(52) U.S. Cl.
CPC ............. *G02B 6/14* (2013.01); *G02B 6/1223* (2013.01); *G02B 6/1228* (2013.01);
(Continued)

(58) Field of Classification Search
CPC ........ G02B 6/1228; G02B 6/14; G02B 6/305;
G02B 2006/12152; G02B 2006/12085;
G02B 2006/12147; G02B 2006/12097
See application file for complete search history.

(56) References Cited

U.S. PATENT DOCUMENTS 6,341,189 B1 * 1/2002 Deacon .................... H01S 5/026
385/130
10,007,060 B1 * 6/2018 Qian ..................... G02B 6/136
(Continued)

FOREIGN PATENT DOCUMENTS

CN 101641622 A 2/2010
CN 106125195 A 11/2016
(Continued)

OTHER PUBLICATIONS

PCT International Search Report and Written Opinion, International Application No. PCT/EP2020/056935, International Filing Date, Mar. 13, 2020, 15 pages.
(Continued)

*Primary Examiner* — Omar R Rojas
(74) *Attorney, Agent, or Firm* — Ryan Dean; Umberg Zipser LLP

(57) ABSTRACT

An optical mode-size converter is presented, which includes a guiding portion, a first strip with a first refractive index, and a second strip with a second refractive index. The first refractive index and the second refractive index are higher than a refractive index of the guiding portion, and a section of the first strip and a section of the second strip overlap to form an evanescent coupling region. The optical mode-size converter further comprises a coupling layer disposed between the first strip and the second strip within the evanescent coupling region, wherein the refractive index of the coupling layer is larger than the refractive index of the
(Continued)

guiding portion and smaller than the first refractive index and the second refractive index.

22 Claims, 12 Drawing Sheets

(52) U.S. Cl.
CPC .............. *G02B 2006/12061* (2013.01); *G02B 2006/12152* (2013.01); *G02B 2006/12176* (2013.01); *G02B 2006/12195* (2013.01)

(56) References Cited

U.S. PATENT DOCUMENTS

| | | | |
|---|---|---|---|
| 2009/0003770 A1* | 1/2009 | Gill | G02B 6/12002 216/2 |
| 2011/0026880 A1 | 2/2011 | Galli et al. | |
| 2015/0247974 A1 | 9/2015 | Painchaud et al. | |
| 2015/0285997 A1* | 10/2015 | Pan | G02B 6/1228 385/28 |
| 2015/0316720 A1 | 11/2015 | Yang et al. | |
| 2016/0327742 A1* | 11/2016 | Collins | G02B 6/1228 |

FOREIGN PATENT DOCUMENTS

| CN | 106164723 A | 11/2016 |
|---|---|---|
| CN | 106461873 A | 2/2017 |

OTHER PUBLICATIONS

United Kingdom Intellectual Property Office, Combined Search and Examination Report under Sections 17 and 18(3), Sep. 5, 2019, 7 pages.

China Patent Office, Office Action, Dec. 5, 2022, 8 pages.

* cited by examiner

OPTICAL MODE-SIZE CONVERTER

TECHNICAL FIELD

This specification relates to an optical mode-size converter.

BACKGROUND

In recent years, a plethora of applications based on photonic integrated circuits (PICs) have emerged including data centre communications, coherent telecommunications, filters, supercontinuum generation, spectroscopy, biosensing, quantum optics and microwave photonics. With the increasing interest in the emerging photonic circuits, a successful photonic platform requires low-loss waveguide circuits.

SUMMARY

According to an aspect of the present invention, there is provided an optical mode-size converter, comprising a guiding portion, wherein at least a portion of the guiding portion extends between a first end and a second end along a first path, a first strip with a first refractive index, and a second strip with a second refractive index, wherein the first strip and the second strip are embedded within the guiding portion extending along the first path such that a first optical mode received at the first end reaches the first strip before the second strip and such that the second strip extends to the second end, wherein the first refractive index and the second refractive index are higher than a refractive index of the guiding portion, and wherein a section of the first strip and a section of the second strip overlap to form an evanescent coupling region, such that converter is responsive to a first optical mode received at the first end to convert the first optical mode into a second optical mode with a smaller mode size along the first path towards the second end.

A cross section area of the first strip may be smaller than a cross section area of the second strip.

The optical mode-size converter may further comprise a coupling layer disposed between the first strip and the second strip within the evanescent coupling region.

The refractive index of the coupling layer may be larger than the refractive index of the guiding portion and smaller than the first refractive index and the second refractive index.

A thickness of the coupling layer may range from 10 nm to 400 nm.

The first strip may be elongate along the first path and may comprise a first facet and a second facet perpendicular to the first path, wherein the first facet is closer to the first end than the second facet, and wherein the second strip is elongate along the first path and comprises a first facet within the guiding portion.

The first end of the first strip may be closer to the first end than the first end of the second strip, and the evanescent coupling region may be formed between the first facet of the second strip and the second facet of the first strip.

The first strip may terminate at the first end such that the first facet of the first strip is at the first end.

The first facet of the first strip may be at a predetermined distance from the first end.

A cross-section area of the second strip in the evanescent coupling region may gradually increase along the first path towards the second end, A width of the second strip may vary from 10 nm to 2 μm when the thickness of the second strip is between 200 nm to 2 μm mover a length ranging from 10 μm to 1 mm.

A cross-section area of the first strip may gradually increase along the first path towards the second end in the evanescent coupling region.

A width of the first strip may vary from 10 nm to 2 μm when the thickness of the first strip is between 100 nm and 400 nm over a length ranging from 10 μm to 1 mm.

A cross-section of the first strip, along the first path towards the second end, may gradually increase in a first region, remains the same in a second region and gradually decreases in a third region. The third region may comprise the portion of the first strip overlapped with the portion of the first strip and gradually increases along the first path towards the second end. A cross-section area of portion of the second strip overlapped with the portion of the first strip may gradually increase along the first path towards the second end.

A length of the first region and the third region may range from 10 μm to 1 mm, wherein a width of the first region and the third region ranges from 10 nm to 300 nm when the thickness of the first strip is between 100 nm and 400 nm, and wherein a width of the second region ranges from 500 nm to 3 μm.

A waveguide formed by the first strip as a core and the guiding portion as a cladding may be below a cutoff condition at an operating wavelength.

The guiding portion may be arranged to support the propagation of the first optical mode from the first end to the second end.

The second refractive index may be substantially identical to a refractive index of a core of a waveguide connected to the second end and arranged to support the second optical mode exiting the optical mode-size converter.

The refractive index of the guiding portion may be substantially identical to a refractive index of a cladding of the waveguide.

The first refractive index and the second refractive index may be substantially identical.

According to another aspect of the present invention, there is provided by a waveguide chip connectable to an optical fiber comprising the aforementioned optical mode-size converter and a waveguide, wherein the first end is a facet of the waveguide chip and the second end is within the waveguide chip, wherein the first end is arranged to receive from a light from the optical fiber supporting the first optical mode, wherein the waveguide is arranged to support the second optical mode and connected to the second strip at the second end.

The first end may be arranged to receive light from the optical fiber when a cleaved facet of the optical fiber is butt-coupled to the first end.

The guiding portion may comprises a core portion and at least one trench, wherein the refractive index of the core portion is higher than the refractive index of the at least one trench.

The at least one trench may comprise two slabs which delimit two opposite sides of the guiding portion.

The second refractive index may be substantially identical to a refractive index of a core of the waveguide, and the cross section of the second strip may be substantially identical to the cross section of the core of the waveguide at the second end.

According to another aspect of the present invention, there is provided a method for fabricating an optical mode-size converter, the method comprising, in the following sequence, depositing a lower core portion on a substrate, depositing a layer containing a material for a second strip, etching the second strip, depositing a layer containing a material for a coupling layer, depositing a layer containing a material for a first strip, etching the first strip, depositing an upper core portion, forming gaps for a trench, and filling the gaps for the trench, wherein a refractive index of the first strip and a refractive index of the second strip are higher than a refractive index of the lower core portion, a refractive index of the coupling layer, and a refractive index of the upper core portion, wherein a refractive index of the trench is lower than the refractive index of the lower core portion and the refractive index of the upper core portion, and wherein a thickness of the coupling layer is such that a portion of the second strip is evanescently coupled with a portion of the first strip.

According to another aspect of the present invention, there is provided a method for fabricating an optical mode-size converter, the method comprising, in the following sequence, depositing a lower core portion, etching a trench for a second strip, depositing a layer containing a material for the second strip, etching and planarising to form the second strip, depositing a coupling layer, depositing a layer containing a material for the first strip, etching the first strip, depositing an upper core portion, forming gaps for a trench and filling the gaps, wherein a refractive index of the first strip and a refractive index of the second strip are higher than a refractive index of the lower core portion, a refractive index of the coupling layer, and a refractive index of the upper core portion, wherein a refractive index of the trench is lower than the refractive index of the lower core portion and the refractive index of the upper core portion, and wherein a thickness of the coupling layer is such that a portion of the second strip is evanescently coupled with a portion of the first strip.

The first strip may comprise a hydrogenated silicon oxynitride $Si_xO_yN_z$:H, wherein $1 \leq x \leq 2$, $0 < y \leq 2$, $0 < z \leq 4$, such that the refractive index of the first strip is between 1.55 and 3.7.

The first strip may comprise a hydrogen-free silicon oxynitride $Si_xO_yN_z$, wherein $1 \leq x \leq 2$, $0 < y \leq 2$, $0 < z \leq 4$, such that the refractive index of the first strip is between 1.55 and 3.7.

The second strip may comprise a hydrogenated silicon oxynitride $Si_xO_yN_z$:H, wherein $1 \leq x \leq 2$, $0 < y \leq 2$, $0 < z \leq 4$, such that the refractive index of the first strip is between 1.55 and 3.7.

The second strip may comprise a hydrogen-free silicon oxynitride $Si_xO_yN_z$, wherein $1 \leq x \leq 2$, $0 < y \leq 2$, $0 < z \leq 4$, such that the refractive index of the first strip is between 1.55 and 3.7.

According to another aspect of the present invention, there is provided a photonic integrated system, comprising a plurality of waveguides, wherein at least two of the plurality of waveguides are interconnected by the aforementioned mode-size converter.

According to another aspect of the present invention, there is provided a photonic integrated system, comprising aforementioned waveguide chip.

According to another aspect of the present invention, there is provided a structure for mode-size converter wherein a double layer waveguide is embedded into a cladding material and the double layer thereof provides low loss evanescent coupling for optical mode propagation.

According to another aspect of the present invention, there is provided a spot-size converter having a substrate, a first waveguide material and a combination of one or more cladding materials that provides low-loss optical input/output coupling between an optical fiber and a photonic circuit and whose said optical coupled mode propagates further to an extended region from a second waveguide surrounded by a second cladding-material geometry further to a region having a third cladding-material geometry.

According to another aspect of the present invention, there is provided an integrated mode converter device comprising a strip waveguide reaching an input/output facet at one end and evanescently coupled to a second waveguide to the other end, wherein the second waveguide further extends outside said mode-converter device to carry an input/output optical signal to a photonic integrated circuit.

According to another aspect of the present invention, there is provided an optical mode-size converter manufacturing method including: forming a first waveguide onto a first cladding material that is extended from a first tapered end and a second end; forming a coupling-layer above such first waveguide layer; forming a second waveguide physically aligned with the first waveguide layer, being the second waveguide layer overlapping the first waveguide layer at one end and reaching a facet to a second end. In the optical mode-converter device, the cladding geometry and double-layer waveguide design may be such that mode-conversion losses may be reduced or minimized for a given optical mode and that a plurality of the mode-converters having different designed structure may provide a low-loss multi-mode input/output interface to a photonic integrated circuit.

In the optical mode-converter device, the cladding geometries and double-layer waveguide design may be such that a region of free-space extends between the first waveguide end to a facet cladding termination end forming an interface to an input/output optical fiber.

The mode-size converter may comprise a first waveguide layer having a thickness t1 embedded into a combination of cladding materials that operates to introduce an optical mode to and from an optical fiber, and a second waveguide layer having a thickness t2 evanescently coupled to the first waveguide layer, and $t1 < t2$.

In the mode-size converter, one end of the second waveguide layer may be tapered in a region which spatially overlaps with said first waveguide layer and tapering length may be between 10 μm and 1 mm and its width varies along the length from 10 nm to 2 μm.

In the mode-size converter, the end of the first waveguide layer that does not overlap with said second waveguide layer may be also tapered and, tapering length may be between 10 μm and 1 mm and, its width varies along the length from 10 nm to 2 μm. In the mode-size converter, the end of the first waveguide layer that does not overlap with said second waveguide layer may terminate at a facet.

In the mode-size converter, the end of the first waveguide layer that does not overlap with said second waveguide layer may terminate at a given distance from a facet. In the mode-size converter, while an optical signal propagates to and from the mode-converter, its optical mode-size may depend on its position between the facet and second waveguide layer.

In the mode-size converter, while an optical signal propagates to and from a facet to a region where the two waveguide layers overlap, its mode-size may be confined such that it may spatially overlap both waveguides and, the optical signal may further propagate between the two waveguides by evanescent-coupling and the optical signal may further propagate and is mode-size may be further converted in a region where only first waveguide layer is present.

In the mode-size converter, the combination of cladding materials above the tapered portions and non-tapered portions of the waveguides may be structured in order to provide at least three stages of mode-size conversion to a bi-directional optical signal. In the mode-size converter, while an optical signal propagates to and from a facet to a region where the two waveguide layers overlap, its mode-size may be confined such that it may spatially overlap both waveguides and, the optical signal may further propagate between the two waveguides by evanescent-coupling and, the optical signal may further propagate and its mode-size may be further converted in a region where only first waveguide layer is present.

In the mode-size converter, the combination of cladding materials above the tapered portions and non-tapered portions of the waveguides may be structured in order to provide at least three stages of mode-size conversion to a bi-directional optical signal According to another aspect of the present invention, there is provided a mode-size converter, comprising a first waveguide layer embedded into a combination of cladding materials that is arranged to operate to introduce an optical mode to and from a light source, a second waveguide layer arranged to be evanescently coupled to the first waveguide layer, and a facet interface between one end of the first waveguide layer and the facet.

In the mode-size converter, first waveguide layer may be made of hydrogenated silicon oxynitride, $Si_xO_yN_z$:H, such that: $1 \leq x \leq 2, 0 < y \leq 2, 0 < z \leq 4$, and an effective refractive index neff may be provided at a given optical wavelength between 1.55 and 3.4 for a given optical mode.

In the mode-size converter, first waveguide layer may be made of hydrogen-free silicon oxynitride, $Si_xO_yN_z$, such that: $1 \leq x \leq 2, 0 < y \leq 2, 0 < z \leq 4$, and it may provide an effective refractive index neff at a given optical wavelength between 1.55 and 3.7 for a given optical mode.

In the mode-size converter, said first waveguide may comprise a first section length L1 and by a first width W1, and a second taper length L2 and second W2 and a central width Wc such that the total length of first waveguide may be L1+L2 and, the first section of said waveguide may comprise a first end having wherein W1≤Wc and a second end having width Wc and, the second section of the waveguide comprises a first end having W2≤Wc and a second end having width Wc and the two sections may be arranged to join at a point where their widths are equal to Wc.

The mode-size converter may be such that, 10 μm<L1, L2<1000 μm and 10 nm<W1,W2<300 nm and 500 nm<Wc<3 μm.

According to another aspect of the present invention, there is provided a mode-size converter, comprising a first waveguide layer having a thickness t1 embedded into a combination of cladding materials that may operate to introduce an optical mode to and from an optical fiber, a second waveguide layer having a thickness t2 evanescently coupled to the first waveguide layer, and t1<t2, and a coupling layer inserted between the first and second waveguides and a facet interface between one end of the first waveguide layer and the facet.

In the mode-size converter, one end of the second waveguide layer may be tapered in a region which spatially overlaps with said first waveguide layer.

In the mode-size converter, one or two ends of the first waveguide layers may be tapered.

In the mode-size converter, the end of the first waveguide layer that does not overlap with said second waveguide layer may terminate at a given distance from a facet which is greater or equal than zero.

In the mode-size converter, one end of the first waveguide layer may be tapered to either favor optical mode propagation to and from the evanescent coupling region or to favor optical mode propagation to and from the facet.

In the mode-size converter, the end of the second waveguide layer may be tapered to favor optical mode propagation to and from the evanescently coupling region.

BRIEF DESCRIPTION OF THE DRAWINGS

Certain embodiments of the present invention will now be described, by way of example, with reference to the accompanying drawings, in which.

DETAILED DESCRIPTION

Waveguide circuits for photonic applications may include more than one type of waveguides, each with a different mode area. In this case, it may be required to convert one guided mode to another with low transmission loss. For example, light from an optical fiber may be coupled from a photonic chip. For another example, two or more waveguides with different mode areas may be fabricated within a waveguide chip. In order to reduce power loss, a mode-size converter for converting one optical mode to another with low loss may be devised and disposed between waveguides having different mode areas.

Figure 1:
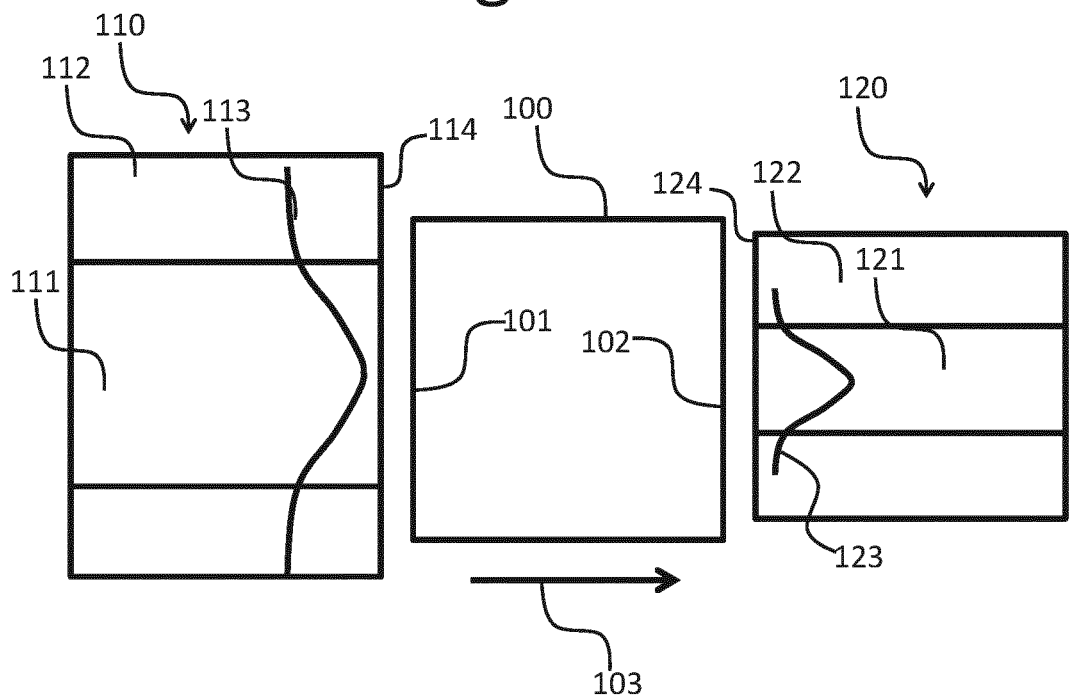
FIG. 1 is a schematic that illustrates an exemplary embodiment of a mode-size converter.

FIG. 1 is a schematic that illustrates an exemplary embodiment of a mode-size converter 100.

The mode-size converter 100 may be disposed between a first waveguide 110 and a second waveguide 120. The first waveguide 110 may comprise a core 111 and a cladding 112 and support at least a first guided mode 113, which is a supported mode of the first waveguide 110. The second waveguide 120 may comprise a core 121 and a cladding 122 and support at least a second guide mode 123, which is a supported mode of the second waveguide 120.

In this specification, the mode area of the first guided mode 113 will be assumed to be larger than the mode area of the second guided mode 123. This is to illustrate that the mode-size converter 100 may be used for converting a first optical mode with a first predetermined mode area to a second optical mode with a second predetermined mode area, wherein the first predetermined mode area is larger than the second predetermined mode area.

The mode-size converter 100 comprises a first end 101 and a second end 102. The first guided mode 113 may be incident on the first end 101, be converted into the second guided mode 123 within the mode-size converter 100 and exit through the second end 102. Alternatively, the second guided mode 123 may be incident on the second end 102, be converted into the first guided mode 113, within the mode-size converter 100 and exit through the first end 101. The mode-size converter 100 may operate in both directions. The mode-size converter 100 may be a reciprocal device, as will be explained in more detail below.

The mode-size converter 100 may provide a larger conversion efficiency at least compared to the case where the first waveguide 110 is simply brought into proximity of, so-called butt coupled to, the second waveguide 120. In this case, the efficiency of coupling is determined by an overlap integral between the two guided modes 113, 123. Since the conversion efficiency diminishes as the difference in the sizes of the transverse guided modes 113, 123 increases, this may not be practical for many photonic applications.

The mode-size converter 100 may be arranged to support the propagation of an electromagnetic mode within the mode-size converter 100, which gradually changes from the first guided mode 113 near the first end 101 to the second guided mode 123 near the second end 102. The area of the guided mode may gradually change as it propagates within the mode-size converter 100.

In an ideal case, the conversion from the first guided mode 113 to the second guided mode 123 may be substantially lossless if the following conditions are met. First, when the first waveguide no and the second waveguide 120 are brought into the proximity of the first end 101 and the second end 102, the first guided mode 113 is coupled into the mode-size converter at the first end 101 without substantial loss. Second, the first guided mode 113, which enters the first end 101, may gradually change to the second guided mode 123 towards the second end 102 substantially without substantial loss. Third, the mode inside the mode-size converter 100 near the second end 102 exits the second end 102 and couples into the second guided mode 123 without substantial loss. The mode-size converter 100 may be designed considering these conditions to minimise loss in conversion from the first guided mode 113 to the second guided mode 123.

The mode-size converter 100 may be embedded within or fabricated as a part of a waveguide chip. In this case, the first end 101 or the second end 102 may be a facet of the waveguide chip. Alternatively, the first end 101 or the second end 102 may be an end formed within a waveguide chip.

For example, the first waveguide 110 may be a single mode fiber and the mode-size converter 100 and the second waveguide 120 may be fabricated within a single waveguide chip. In this case, a cleaved end of the single mode fiber, the first waveguide 110, may be approached to the facet of the waveguide chip, the first end 101, such that the first guided mode 113 may be incident on the facet of the waveguide chip, the first end 101. The second end 102 may be defined within the waveguide chip as the boundary between the mode-size converter 100 and the second waveguide chip 120. The propagating mode incident from the single mode fiber may be converted within the mode-size converter 100 within the waveguide chip, and exit through the second end 102, formed within the waveguide chip, towards the second waveguide 120, also formed within the second waveguide chip 120.

In some implementations, in case the mode-size converter 100 and at least one of the first waveguide 110 and the second waveguide 120 may be integrated within the single waveguide chip, the end 101, 102 between the mode-size converter 100 and one of the waveguides 110, 120 may not be defined as a single planar interface within the waveguide chip. For example, at least a portion of the mode-size converter 100 and at least a portion of the one of the waveguides 110, 120 may be integrally formed to be of the same material in one fabrication step.

The first waveguide 110 or the second waveguide 120 may support more than one modes. In that case, the mode-size converter 100 may be designed to convert at least one of the supported modes of the first waveguide 110 into at least one of the supported modes of the second waveguide 120. For brevity of discussion, for the rest of the specification, when the first waveguide 110 or the second waveguide 120 supports more than one supported mode, the lowest order mode supported by each waveguide 110, 120 will be considered. However, the concept described in this specification may be applied to any desired modes of supported by the waveguides 110, 120.

The mode-size converter 100 may be used with any waveguide 110, 120 capable of supporting guided modes 113, 123 or any optical modes with a well-defined supported modes, such as a transverse mode.

The examples of the waveguides 110, 120 include single-mode fibres, multi-mode fibres, UV-written waveguides, SOI (silicon-on-insulator) waveguides, polymer waveguides, waveguides defined by microfluidic channels. However, the examples of waveguides are not limited to these examples.

The first and second guided modes 113, 123 to be used with the mode-size converter 100 is not limited to the supported modes travelling within the waveguides 110, 120 and may also be provided with a free-space propagating beam of light, which provides a well-defined mode capable of being coupled into the mode-size converter 100 at either the first end 101 or the second end 102. For example, a laser beam with a transverse Gaussian intensity profile may be focused and directed to be incident on either the first end 101 or the second end 102 of the mode-size converter 100.

The mode-size converter 100 may be a reciprocal device as far as the mode properties are concerned. In other words, the guided mode travelling in a first direction 103, from the first end 101 to the second end 102 of the mode-size converter 100, may be converted from the first guided mode 113 to the second guided mode 123 by the mode-size converter 100. The guided mode travelling opposite the first direction 103 may be converted from the second guided mode 123 to the first guided mode 113 by the mode-size converter 100. The spatial distribution of the electromagnetic modes within the mode-size converter 100 may be substantially the same except the propagation direction. Therefore, the mode-size converter 100 can be used both for converting the first guided mode 113 into the second guided mode 123, and for converting the second guided mode 123 into the first guided mode 113. The mode properties of the incident guided modes 113, 123 may be converted in a reciprocal fashion by the mode-size converter 100.

For brevity of description, it is assumed that the first direction 103, in which the guided mode travels within the optical mode-size converter 100, is straight, extending in a linear line. However, the first direction 103 may be curved, following a predetermined path within the optical mode-size converter 100. In this case, the features described using the phrase 'in the first direction' or 'towards the second end' in this specification may be understood to be 'along the predetermined path' if the optical mode-size converter 100 supports a guided mode in the predetermined path which is not straight.

The mode-size converter 100 may be a passive and reciprocal device. For example, the mode-size converter 100 may comprise a dielectric material, such as silicon dioxide or silicon nitride, which is largely transparent at the operating wavelength of the guided modes 113, 123 incident on the mode-size converter 100, without amplification or magneto-optical activity.

For brevity of the description, it will be assumed in this specification, unless otherwise noted, that the first guided mode 113 and the second guided mode 123 and the propagating mode within the mode-size converter 1006 are an electromagnetic wave centred at a single operating wavelength. For example, the first guided mode 113 and the second guided mode 123 may be a laser beam at 1550 nm wavelength.

Multiple wavelengths may be operable with the mode-size converter 100 as long as they do not affect the operation at the other wavelength. For example, if two laser wavelengths, 1550 nm and 1555 nm, may be used with one mode-size converter 100 simultaneously insofar as any of the two laser lights induce thermal effects or nonlinear effects within the mode-size converter 100.

The mode-size converter 100 may possess any further optical properties than mode conversion, such as magneto-optical property or gain property, where the behaviour of the guided modes 113, 123 depends on whether the guided modes 113, 123 are incident on the first end 101 or the second end 102, in other words, which are non-reciprocal. Therefore, the mode-size converter 100 may not be a reciprocal device in one or more properties of light, which are largely independent from the mode properties of the guided modes 113, 123.

For example, the mode-size converter 100 may be a material which allows a magneto-optic manipulation such that the polarisation of the guided mode travelling within the made conversion device 100 may undergo a non-reciprocal rotation under the influence of a magnetic field. However, this property may not interfere with the mode propagation properties of the mode-size converter 100. The magneto-optical activity will not heavily affect the mode properties of the guided modes 113, 123 and the operation of the mode-size converter 100 in relation to the mode properties.

For another example, the mode-size converter 100 may be an active device. In other words, the mode-size converter 100 may be arranged to amplify the intensity of the guided modes 113, 123 incident on the mode-size converter 100 as they propagate through the mode-size converter 100. The mode-size converter may comprise one or more doped solid state materials such as Nd:YAG, Ti:Sa or one or more dielectric materials doped with ions such as Erbium or one or more semiconductor optical amplifier materials such as GaAs/AlGaAs. However, this property may not interfere with the mode propagation properties of the mode-size converter 100. The properties related to the amplification will not heavily affect the mode properties of the guided modes 113, 123, for example, from the thermal effects, and the operation of the mode-size converter too in relation to the mode properties.

Figure 2:
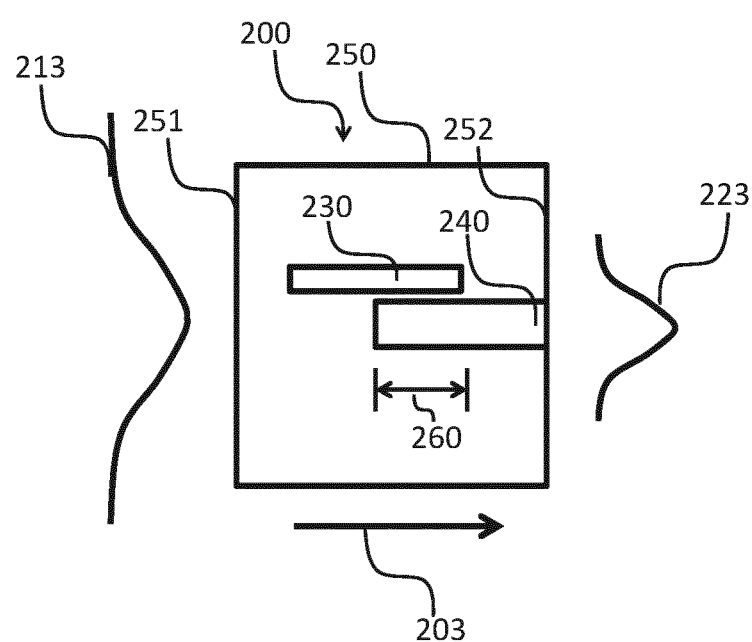
FIG. 2 is a schematic that illustrates an exemplary embodiment of a mode-size converter.

FIG. 2 is a schematic that illustrates an exemplary embodiment of the mode-size converter 200 with references to FIG. 1.

In the example of FIG. 2, it will be assumed that the mode area of the first guided mode 213 is larger than the mode area of the second guided mode 223.

For brevity, in this specification, the operation of the mode-size converter 200 will be described mainly following the electromagnetic mode propagating in the first direction 203, namely from a larger first guided mode 213 to a smaller second guided mode 223.

However, since the mode-size converter 200 is a reciprocal device as discussed above, the operating principle described below also applies to an electromagnetic mode propagating in an opposite direction to the first direction 203 in a reverse order.

The mode-size converter 200 may comprise a guiding portion 250. The mode-size converter 200 may further comprise a first end 251 which the first guided mode 213 may be incident on or exit from. The mode-size converter 200 may further comprise a second end 252 which the second guided mode 223 may be incident on or exit from.

The first end 251 and the second end 252 may be comprised by the guiding portion 250.

As discussed above, the first end 251 and the second end 252 may be a facet of a waveguide chip, or a planar interface within a waveguide chip or defined as a general transition region from the mode-size converter 200 to the first waveguide 110 or the second waveguide 120 within a waveguide chip. The examples of the ends 251, 252 are not limited to these examples. Any feature acting as a transition region from the first waveguide 110 or the second waveguide 120 to the mode-size converter 100, 200 may serve as the ends 251, 252.

The mode-size converter 200 may be arranged such that when the first guided mode 213 is incident on the first end 251 of the mode-size converter 200, the first guided mode 213 may be converted to the second guided mode 223 as it propagates through the mode-size converter 200 in the first direction 203 towards the second end 252.

The guiding portion 250 may be arranged to support the propagation of the first guided mode 213 such that the first guided mode 213 propagates substantially without loss at least over a distance between the first end 251 and the second end 252.

In some implementations, the guiding portion 250 may comprise the first end 251 and the second end 252.

The distance between the first end 251 and the second end 252 of the guiding portion 250 may range from a few operating wavelengths to tens of operating wavelengths. For example, when the operating wavelength is 1550 nm, the length of the guiding portion in the first direction 203 may range from a few microns to hundreds of microns.

This length may be adjusted to optimise the conversion efficiency, along with other parameters which will be described later.

The conversion efficiency of the mode-size converter 200 may be defined in this specification to be the ratio of the powers of the second guided mode 223 to the first guided mode 213 in case the mode propagates in the first direction 203. The conversion efficiency of the mode-size converter 200 may be defined to be the ratio of the powers of the first guided mode 213 incident on the first end 251 to the second guided mode 223 exiting through the second end 252 in case the mode propagates in the opposite direction to the first direction 203. Considering that the mode-size converter 200 is a reciprocal device, the conversion efficiency may be substantially the same regardless of the propagation direction of the mode.

In the cross section defined to be perpendicular to the first direction 203, the guiding portion 250 may form a core-cladding structure arranged to support the propagation of the first guided mode 213.

For example, the cross section area and the refractive index distribution in the cross-section of the guiding portion 250 may be arranged such that it supports the propagation of a HE11 mode of the operation wavelength over the distance between the first end 251 and the second end 252. In this case, the first guided mode 213 incident from a single mode fiber may be supported by the guiding portion 250.

Alternatively, the cross-section and the refractive index of the guiding portion 250 may be arranged in view of the refractive index of the surrounding material around the guiding portion 250 such that the first guided mode 213 can propagate through the guiding portion 250 substantially without loss. In this case, the guiding portion 250 itself may be regarded as a core and the surrounding material around the guiding portion 250 may be regarded as a cladding.

Alternatively, in order to support the propagation of the first guided mode 213, the guiding portion 250 may comprise at least a first material and a second material, wherein the first material has a higher refractive index than the second material and the first material is positioned closer to the centre of the first guided mode 213 than the second material.

In some implementations, the guiding portion may comprise a silicon dioxide material as the core and the cladding part may be doped to have a refractive index smaller than the core by 1% or less by applying a different concentration of dopants such as GeO2.

In some implementations, the guiding portion 250 may comprise a silicon oxide as the first material and a porous silicon oxide as the second material.

The mode-size converter 200 further comprises a first strip 230 and a second strip 240 embedded within the guiding portion 250. The refractive index of the first strip 230 and the refractive index of the second strip 240 are higher than the refractive index of the guiding portion 250.

The refractive index of the first strip 230 may be larger than or equal to the refractive index of the second strip 240. In this example, the operation of the mode-size converter 200 is described mainly following the electromagnetic mode propagating in the first direction 203, namely from a larger first guided mode 213 to a smaller second guided mode 223.

The first strip 230 may comprise a dielectric material substantially elongated along the first direction embedded within the guiding portion 250.

The second strip 240 may comprise a dielectric material substantially elongated along the first direction embedded within the guiding portion 250.

In some implementations, the cross-section of the first strip 230 may have a predetermined shape which is substantially the same throughout the length of the first strip 230. For example, the cross-section of the first strip 230 may be a square throughout the length of the first strip 230.

In some implementations, the shape or the area of the cross-section of the first strip 230 may not be the same throughout the length of the first strip 230. For example, the area of the cross-section of the first strip 230 may gradually increase in the first direction 203.

In some implementations, the refractive index of the first strip 230 and the cross-section of the first strip 230 may be arranged such that a waveguide formed by the first strip 230 as a core and the guiding portion 250 as a cladding is under a cut-off condition for the operating wavelength.

For example, when the operating wavelength is 1550 nm, the first strip 230 may comprise a silicon oxynitride with refractive index 1.9 and have a square cross section of 200 nm×100 nm throughout the length of the first strip 230. The guiding portion 250 may comprise a silicon dioxide. In this case, the waveguide formed by the first strip 230 as the core and the guiding portion 250 as the cladding may not support any guided mode at the operating wavelength of 1550 nm. However, the transverse intensity distribution of the first guided mode 213 may get increasingly concentrated around the first strip 230 as it propagates in the first direction, due to the influence of the first strip 230.

In some implementations, the refractive index of the first strip 230 and the cross-section of the first strip 230 may be arranged such that a waveguide formed by the first strip 230 as a core and the guiding portion 250 as a cladding is at or above a cut-off condition for the operating wavelength. In this case, also the transverse intensity distribution of the first guided mode 213 may get concentrated more and more towards the first strip 230 as it propagates in the first direction. The first guided mode 21 may convert into the guided mode of the waveguide formed by the first strip 230 as a core and the guiding portion 250 as a cladding.

Due to the presence of the first strip 230, the mode area of the guided mode within the mode-size converter 200 may gradually decrease as the guided mode propagates in the first direction 203.

The guiding portion 250 may initially support the first guided mode 213 near the first end 251 but the mode area may decrease due to the presence of the first strip 230, whose refractive index is higher than that of the guiding portion 250. As it propagates, the guided mode may be concentrated near the first strip 230.

In case the waveguide formed by the first strip 230 as a core and the guiding portion 250 as a cladding is above a cut-off condition, therefore supports a guided mode, the guided mode may transform from the first guided mode 213 into the guided mode supported by the first strip 230.

In case the waveguide formed by the first strip 230 as a core and the guiding portion 250 as a cladding is under a cut-off condition, the area of the guided mode may gradually decrease starting from the first guided mode 213. As it propagates, the guided mode may become centred around the first strip 230.

The first strip 230 may be disposed along the first direction 203 and positioned substantially near a line extending in the first direction 203 from the centre of the first guided mode 213 at the first end 251. For example, when the operating wavelength is 1550 nm, the distance between the first strip 230 and the line extending in the first direction 203 from the centre of the first guided mode 213 at the first end 251 may be kept below 3.5 µm in order to keep the coupling loss below 3 dB. In case the first guided mode 213 is launched from a single mode fiber into the first end 251, 3.5 µm may correspond to the alignment tolerance of the single mode fiber and the first strip 230.

The first strip 230 may be positioned within the guiding portion 250 with respect to the first end 252 such that the guided mode within the guiding portion 250 couples efficiently to the first guided mode 213 as it enters the guiding portion.

As shown in the example of FIG. 2, there may be a predetermined distance between a first end of the first strip 230 and the first end 251, wherein the first end of the first strip is closer to the first end 251 than a second end of the first strip 230.

Alternatively, the first strip 230 may extend up to and terminate at the first end 251. In other words, the first end of the first strip 230 may be disposed at the first end 251.

In some implementations, the cross-section of the second strip 240 may be a predetermined shape throughout the length of the first strip 240. For example, the cross-section of the second strip 240 may be a square throughout the length of the second strip 240.

The first strip 230 may be positioned along the first direction 203 such that when the first guided mode 213 is incident on the first face 251, the first guided mode 213 may reach the first strip 230 before it reaches the second strip 240.

The second strip 240 may be disposed along the first direction 203 and positioned substantially near a line extending in the first direction 203 towards the centre of the second guided mode 223.

The second strip 240 may be positioned within the guiding portion 250 with respect to the second end 252 such that the guided mode within the guiding portion 250 couples efficiently to the second guided mode 223 as it exits the guiding portion.

In some implementations, the second strip 240 may extend up to and terminate at the second end 252.

Alternatively, the second strip 240 may extend up to the second end 252 and be a continuous extension of a core of the second waveguide 120 supporting the second guided mode 123, 223.

For example, the mode-size converter 100, 200 and the second waveguide 120 may be fabricated within a single waveguide chip and the second strip 240 and the core of the second waveguide 120 may be fabricated to be a single continuous strip. In this case, the second end 252 may not defined as a planar end perpendicular to the first direction 203 but a general area of transition between the mode-size converter 250 and the second waveguide 120.

In some implementations, the waveguide formed by the second strip 240 as a core and the guiding portion 250 as a cladding may support the propagation of a guided mode substantially similar to the second guided mode 223.

In some implementations, the shape or the area of the cross-section of the second strip 240 may not be the same throughout the length of the second strip 240. In this case, only a portion of the second strip 240, for example towards the second end 252, may be capable of supporting the second guided mode 223 along with the guiding portion 250 as a cladding.

At least a portion of the first strip 230 is disposed in the vicinity of a portion of the second strip 240 to form an evanescent coupling region 260. Within the evanescent coupling region 260, the first strip 230 and the second strip 240 may be positioned close enough such that an evanescent coupling or nearfield interaction between the first strip 230 and the second strip 240 is possible.

The distance between the first strip 230 and the second strip 240 within the evanescent coupling region 260 is defined to be the distance between the closest points between the surface of the first strip 230 and the surface of the second strip 240, viewed in the cross-section defined perpendicular to the first direction 203.

The distance may be smaller than the operating wavelength of the first guided mode 213 and the second guided mode 223. For example, when the operating wavelength is 1550 nm, the distance may be smaller than 400 nm.

In some implementations, the distance between the first strip 230 and the second strip 240 within the evanescent coupling region 260 may be constant within the evanescent coupling region 260.

Alternatively, the distance between the first strip 230 and the second strip 240 within the evanescent coupling region 260 may change within the evanescent coupling region 260.

As discussed above, when the first guided mode 213 enters the first end 251, the guided mode may first couple to the first strip 230. Due to the first strip 230, the mode area gradually decreases and become centred around the first strip 230 as it propagates in the first direction 203.

Consequently, the guided mode may enter the evanescent coupling region 260 as it comes into contact also with the second strip 260.

In some implementations, over the distance of the evanescent coupling region 260, due to evanescent coupling, the guided mode may gradually transform into a mode guided by the second strip 240.

Alternatively, over the distance of the evanescent coupling region 260, due to evanescent coupling, the guided mode may gradually transform such that the mode becomes centred around the second strip 240.

As the guided mode exits the evanescent coupling region 260, the guided mode may be centred around the second strip 240.

In some implementations, as the guided mode exits the evanescent coupling region 260, the guided mode may have a mode area substantially similar to the mode area of the second guided mode 223, such that the guided mode couples efficiently to the second guided mode 223. The cross-section of the second strip 240 may be determined such that the mode are of the guided mode supported around the second strip 240 is substantially similar to the mode area of the second guided mode 223.

In some implementations, the evanescent coupling region 260 may extend to the second end 252.

In some implementations, the evanescent coupling region 260 may terminate before the second end 252 with a predetermined distance from the second end 252. In this case, the guided mode, as it exits the evanescent coupling region 260, transforms into a guided mode of the waveguide formed by the second strip 240 as a core and the guiding portion 250 as a cladding. The guided mode may be substantially similar to the second guided mode 223 such that it couples efficiently to the second guided mode 223.

The length of the first strip 230, the second strip 240, the length of the evanescent coupling region 260, may be adjusted to optimise the coupling efficiency.

The length of the evanescent coupling region 260 in the first direction 203 may range from several operation wavelengths to several hundreds of operation wavelengths. For example, the length of the evanescent coupling region 260 may range from 10 μm to 1 mm in case the operation wavelength is 1550 nm.

In some implementations, the cross-section area of the first strip 230 may be smaller than the cross section area of the second strip 240.

In case the width of the cross-sections of the first strip 230 and the second strip 240 are substantially the same, the thickness of the first strip 230 may be smaller than the thickness of the second strip 240.

In case the thickness of the cross-sections of the first strip 230 and the second strip 240 are substantially the same, the width of the first strip 230 may be smaller than the width of the second strip 230.

In some implementations, the cross section area of the first strip 230 may be equal to the cross section area of the second strip 240.

In some implementations, the refractive index of the guiding portion 250 may be substantially the same as the refractive index of the core 121 of the first waveguide 110 and the cladding 122 of the second waveguide 120. This may alleviate loss at the first end 101, 251 and the second end 102, 252.

In some implementations, the refractive index of the second strip 240 may be substantially the same as the refractive index of the core 121 of the second waveguide 120. This may alleviate the loss at the second end 102, 252.

The area or the shape of the cross-section may change along the length of the first strip 230 and the second strip 240. In other words, the first strip 230 and/or the second strip 240 may be tapered.

For example, a width of the first strip 230 may vary from 10 nm to 2 µm when the thickness of the first strip is 200 nm, over a length ranging from 10 µm to 1 mm.

In this specification, the term "tapered" will be understood to mean that the cross section area of the first or second strip gradually changes along the first direction. The term "gradually" also encompasses step-wise changes of one or more of the transverse dimension of the cross-section of the first and/or second strip 230, 240, in so far as the step-wise change does not lead to excessive scattering of light which will lead to severe loss.

In some implementations, the area of the cross section of the second strip 240 may gradually increase towards the second end 252. For example, when the thickness of the second strip 240 may be constant throughout the length of the second strip 240, the width of the second strip 240 may gradually increase in the first direction 203.

In some implementations, the area of the cross section of the second strip 240 may gradually increase towards the second end 252 and subsequently be constant for a predetermined length up to the second end 252. In this case, the cross-section of the second strip 240 at the second end 252 may be substantially the same as the core 121 of the second waveguide 120.

The second strip 240 may be tapered within the evanescent coupling region 260.

For example, a width of the second strip 240 may vary from 10 nm to 2 µm when the thickness of the second strip 240 is 800 nm, over a length ranging from 10 µm to 1 mm.

In some implementations, the area of the cross section of the first strip 230 may gradually increase in the first direction 203.

In some implementations, the area of the cross section of the first strip 230 may gradually increase in the first direction 203, and subsequently decrease in the first direction 203. In this case, the region of the decreasing cross-section area may at least partially overlap with the evanescent coupling region 260.

In some implementations, the cross section of the first strip 230 may be a square and the area of the cross section of the first strip 230 may gradually increase in the first direction 203 in a first region, and stay constant for a predetermined length in a second region and subsequently decrease in the first direction 203 in a third region. In this case, the region of the decreasing cross-section area may at least partially overlap with the evanescent coupling region 260.

For example, the length of the first region and the third region may range from to 10 µm to 1 mm, and the width of the first region and the third region may range from 10 nm to 300 nm when the thickness of the first strip 230 is 200 nm and the width of the second region may range from 500 nm to 3 µm.

Figure 3:
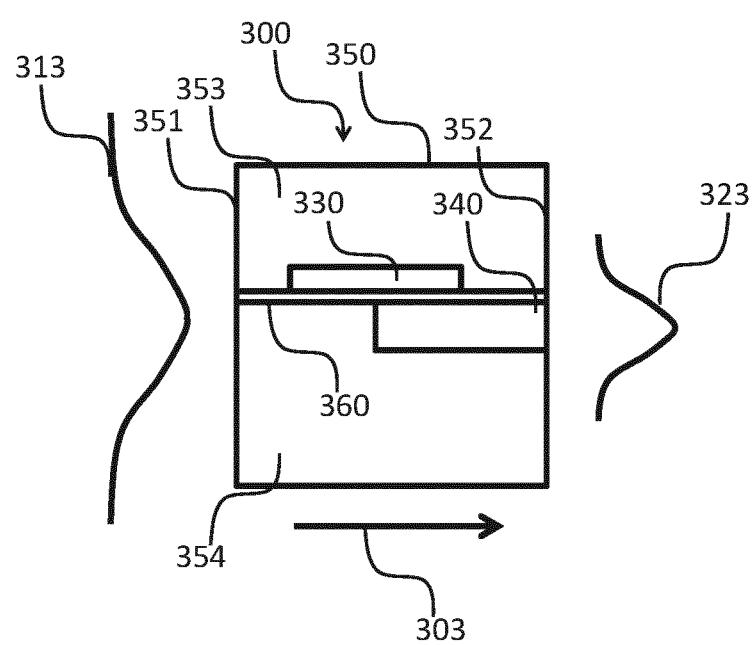
FIG. 3 is a schematic that illustrates an exemplary embodiment of a mode-size converter.

FIG. 3 is a schematic that illustrates an exemplary embodiment of the mode-size converter 300 with references to FIGS. 1 and 2.

The mode-size converter 300 may be arranged to convert a first guided mode 313 to a second guided mode 323 or the second guided mode 323 to the first guided mode 313 with substantially the same conversion efficiency. The mode-size converter 300 may comprise a guiding portion 350, a first end 351, a second end 352, a first strip 330, a second strip 340, which are as described in FIG. 2.

The mode-size converter 300 described in the example of FIG. 3 differs from the mode-size converter 200 described in the example of FIG. 2 in that the mode-size converter 300 comprises a coupling layer 360 in the evanescent coupling region 260 of the example in FIG. 2.

As in the example of FIG. 2, at least a portion of the first strip 330 may be disposed in the vicinity of a portion of the second strip 340. The coupling layer may be disposed within the first strip 330 and the second strip 340 within the region of overlap.

However, in the example of FIG. 3, the distance between the first strip 330 and the second strip 340 in the example of FIG. 3 is defined to be the thickness of the coupling layer 360.

The thickness of the coupling layer 360 may be determined such that an evanescent coupling or nearfield interaction between the first strip 330 and the second strip 340 is supported.

In some implementations, the refractive index of the coupling layer 360 may be higher than the refractive index of the guiding portion 350 and lower than the refractive index of the first strip 330 and the second strip 340.

For example, the thickness of the coupling layer 360 may range from 10 nm to 200 nm when the index of the coupling layer is 1.5.

The coupling layer 360 may divide the guiding portion 350 into an upper guiding portion 353 and a lower guiding portion 354. The refractive index of the upper guiding portion 353 and the refractive index of the lower guiding portion 354 may be different but the refractive indices of both the upper guiding portion 353 and the lower guiding portion 354 may be lower than any one of the refractive indices of the first strip 330 and the second strip 340.

The coupling layer 360 may assist the conversion the first guided mode 313 incident on the first end 351 into a guided mode within the guiding portion 350 concentrated around the first strip 330.

The coupling layer 360 may enhance the efficiency of coupling between the first strip 330 and the second strip 340 by reducing the discontinuity of the refractive indices between the first strip 330.

At least towards the second end 352, a waveguide formed by the second strip 340 and the coupling layer 360 as a core and the upper guiding portion 353 and the lower guiding portion 354 as a cladding may support the propagation of the second guided mode 323, analogous to the operation of a rib waveguide.

For the rest of the specification, exemplar embodiments of the mode-size converter 100, 200, 300 will be presented based on a specific example in which the first waveguide 110 is a single mode fiber and the mode-size converter 100, 200, 300 and the second waveguide 120 are integrally fabricated within a waveguide chip.

Figure 4A:
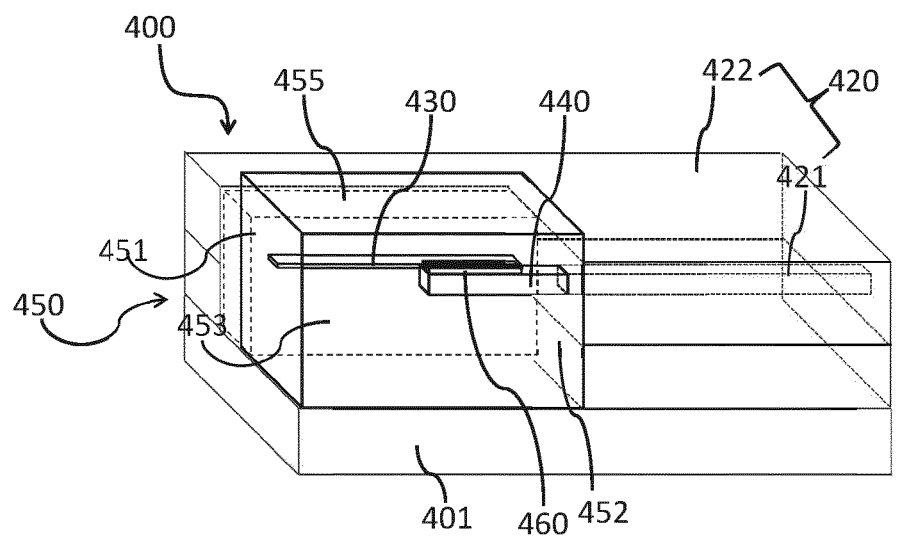
FIGS. 4a to 4e are a schematic that illustrates an exemplary embodiment of a mode-size converter.

FIG. 4a is a schematic that illustrates an exemplary embodiment of the mode-size converter 400.

The mode-size converter 400 and a second waveguide 420 are formed integrally within a waveguide chip built on a substrate 401.

The second waveguide comprises a core 421 and a cladding 422.

The mode-size converter 400 may comprise a guiding portion 450, which may be fabricated as an integral part of the waveguide chip. The guiding portion 450 may comprise a first end 451 and a second end 452.

In some implementations, the first end 451 may be formed as the same plane with the facet of the waveguide chip or the first end 451 may be part of the facet of the waveguide chip.

The guiding portion 450 may further comprise a core portion 453 and a trench portion 455. The refractive index of the trench portion 455 may be lower than the refractive index of the core 453.

The mode-size converter 400 may further comprise a first strip 430 and a second strip 440.

In some implementations, the second strip 440 may be a continuous extension of a core 421 of the second waveguide 420. In this case, the second strip 440 and the core 421 of the second waveguide 420 may be fabricated from a layer formed in a single fabrication step.

In some implementations, the first strip 430 and/or the second strip 440 may comprise a hydrogenated silicon oxynitride.

In some implementations, the first strip 430 and/or the second strip 440 may comprise a hydrogen-free silicon oxynitride.

In some implementations, the refractive index of the cladding part 453 of the guiding portion 450 and the refractive index of the cladding 422 of the second waveguide 420 may be substantially the same. In this case, the cladding part 453 of the guiding portion 450 and the cladding 420 of the second waveguide 420 may be fabricated from a layer formed in a single fabrication step. In this case, the second end 452 may not be formed as a single planar surface defined by discontinuity of materials. The second end 452 may be a plane within the cladding part 453 of the guiding portion 450 and the cladding 420 of the second waveguide 420, from which the guided mode is fully converted to be guided by the second waveguide 420.

In some implementations, the refractive index of the substrate 401 may be substantially the same with the refractive index of the cladding part 453 of the guiding portion 450 and the refractive index of the cladding 422 of the second waveguide 422.

In some implementations, the refractive index of the substrate 401 may be lower than the refractive index of the cladding part 453 of the guiding portion 450 and the refractive index of the cladding 422 of the second waveguide 422.

At least a portion of the first strip 430 may be positioned in the vicinity of the second strip 440 for evanescent coupling.

In some implementations, evanescent coupling between the first strip 430 and the second strip 440 may be mediated by a coupling layer 460 which fills the space between the first strip 430 and the second strip 440.

The refractive index of the coupling layer 460 may be equal or larger than the refractive index of the core portion 453 of the guiding portion 450 and smaller than the refractive index of the first strip 430 and the refractive index of the second strip 440.

In the example of FIG. 4a, the waveguide formed by the first strip 430 as a core and the core portion 453 as a cladding may be under a cut-off condition at the operating wavelength.

Figure 4B:
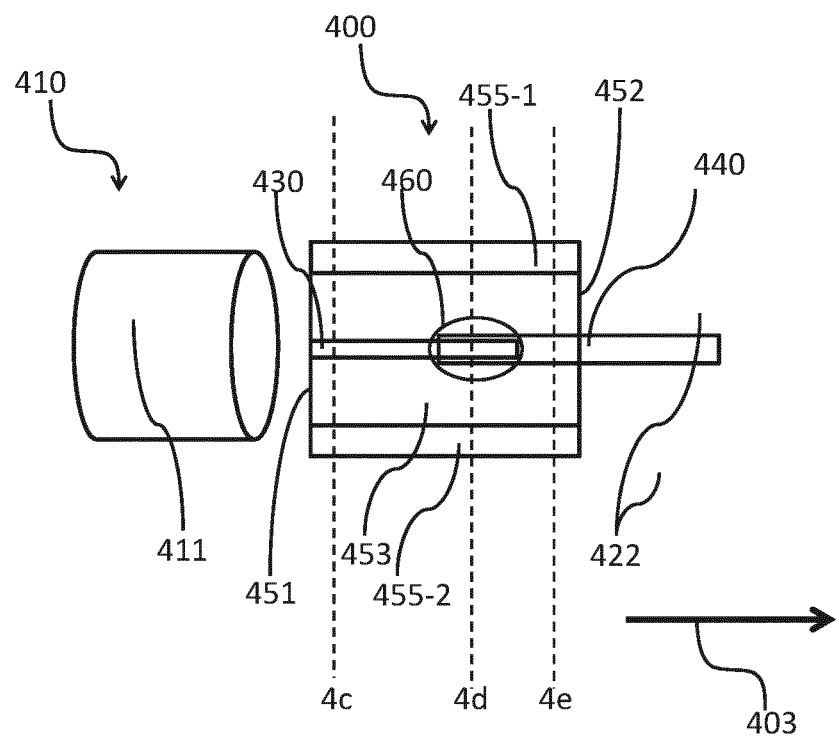

FIG. 4b is a schematic that illustrates an exemplary embodiment of the mode-size converter 400. In particular, FIG. 4b shows a top view looking down on the plane of the substrate 401 of the waveguide chip.

FIG. 4b shows a core 411 of a first waveguide 410, which is a single mode optical fiber (SMF) in this example. The cladding of the single mode fiber, whose lateral extent far exceeds the scale of the drawing in FIG. 4b, is assumed to be present and to be surrounding the core 411.

In some implementations, the first end 451 may be planar and perpendicular to a first direction 403. The first direction 403 is parallel to the direction of the first strip 430, the second strip 440, and the second waveguide 420 and may be parallel to the direction of the guided mode propagating in the guiding portion 450.

In some implementations, the first end 451 may be formed as a plane at an angle between 78 degrees to 90 degrees with respect to the first direction 403.

In some implementations, the angle of the plane of the first end 451 may be defined in a plane defined by the first direction 403 and a normal to the plane of the substrate 401. The angle of the first end 451 may be obtained by adjusting the parameters of etching processes, such that the degree of etching on the first end 451 is varied along a direction perpendicular to the plane of the substrate 401.

In some implementations, the angle of the plane of the first end 451 may be defined in a plane parallel to the plane of the substrate 401. The angle of the first end 451 may be obtained by designing corresponding layers such that the first end 451 is formed as a plane at an angle with respect to the first direction 403.

The angle of the plane of the first end 451 with respect to the first direction 403 may alleviate back-reflection losses at the first end 451 for bi-directional optical signals between the first waveguide 410 and the mode-conversion device 400.

In some implementations, etching process and design may be combined to optimise the shape of the contour of the first end 451 to minimise the back-reflection losses for bi-directional optical signals.

Although FIG. 4b shows that the core 411 is positioned a certain distance away from the first end 451, the facet of the waveguide chip, it is understood that for maximising the coupling efficiency at the first end 451, the core 411 of the single mode fiber needs to be approached as close as possible to the first end 451.

The surface of the first end 451, and the cleaved end of the single mode fiber, at least across the core 411, may be smooth enough to suppress spurious scattering of light at the operating wavelength.

The trench portion 455 may comprise a first trench 455-1 and a second trench 455-2. As shown in FIGS. 4a and 4b, the first trench 455-1 and the second trench 455-2 may be in the form of a slab which extends from the first end 451 and the second end 452.

The first trench 455-1 and the second trench 455-2 may be positioned to cover two lateral surfaces, opposite each other, of the core portion 453 of the guiding portion 450.

The first trench 455-1 and the second trench 455-2 may be filled with a fluid with refractive index smaller than the refractive index of the core portion 453. For example, the first trench 455-1 and the second trench 455-2 may be filled with air or inert gas such as $N_2$.

In some implementations, the top surface of the core portion 453 may be exposed to air and the bottom surface of the core portion 453 may be in contact with the substrate 401.

In some implementations, the top surface of the core portion 453 may be exposed to air.

In some implementations, there may be more than two cladding parts 455-1, 455-2 which are disposed to surround the core portion 453 of the guiding portion 450. A third trench 455-3 (not shown) may be formed near the bottom surface of the core portion 453 in the substrate 401. In this case, the first end 451 may be suspended from the substrate 401.

The refractive indices of the trenches 455-1, 455-2, 455-3 and the substrate 401 may be arranged such that the guiding portion 450 supports the propagation of the mode launched from the single mode fiber 410 at the first end 451 towards the second end 452.

In the direction perpendicular to the plane of the substrate 401, the depths of the first trench 455-1 and the second trench 455-2 may range from 7 to 20 μm.

In the direction perpendicular to the first direction 403 and parallel with the plane of the substrate 401, the widths of the first trench 455-1 and the second trench 455-2 may be larger than 1 μm.

Figure 4C:
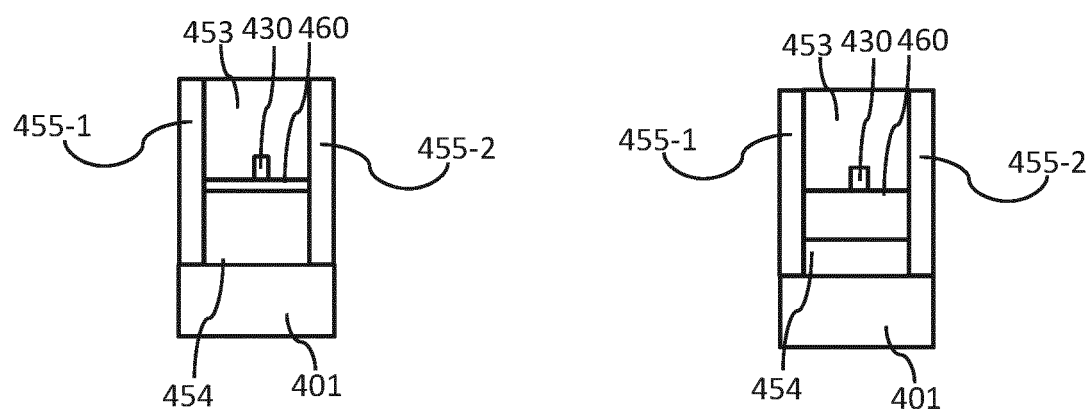

FIG. 4c is a schematic that illustrates an exemplary embodiment of the mode-size converter 400. In particular, FIG. 4c shows a cross-section view of the plane labelled 4c in FIG. 4b.

The coupling layer 460 may be positioned between the first strip 430 and the second strip 440 such that the gap between the first strip 430 and the second strip 440 is filled by the coupling layer 460.

Depending on the method of fabrication as will be described later in FIGS. 7 and 8, the coupling layer 460 may be disposed at least in two different fashions with respect to the second strip 440. These are shown in the left panel and the right panel of FIG. 4c. This will be explained in more detail in FIG. 4d.

In this example, the cross-section of the first strip 430 may be a square. The cross-section of the first strip 430 may be substantially the same throughout the length of the first strip.

The core portion of the guiding portion 450 may comprise an upper core portion 453 and a lower core portion 454. A coupling layer 460 may be disposed between the upper core portion 453 and the lower core portion 454.

In a configuration shown in the left panel, the waveguide formed by the coupling layer 460 as a core and the upper core portion 453 and the lower core portion 454 may support a guided mode. Alternatively, the coupling layer 460 may be thin such that the waveguide formed by the coupling layer 460 as a core and the upper core portion 453 and the lower core portion 454 is under a cut-off condition at the operating wavelength.

In some implementations, in the configuration shown in the left panel, the waveguide formed by the first strip 430 and the coupling layer 460 as a core and the upper core portion 453 and the lower core portion 454 as a cladding may be under a cutoff condition at the operating wavelength.

In some implementations, in the configuration shown in the right panel, the waveguide formed by the first strip 430 as a core and the upper core portion 453 and the coupling layer 460 as a cladding may be under a cutoff condition at the operating wavelength.

In some implementations, the first trench 455-1 and the second trench 455-2 may be disposed such that at least one surface of each of the first trench 455-1 and the second trench 455-2 is perpendicular to the plane of the coupling layer 460 and the plane of the substrate 401.

In some implementations, the first trench 455-1 and the second trench 455-2 may be disposed such that the angle between at least one surface of each of the first trench 455-1 and the second trench portion 455-2 traverses the coupling layer 460 ranges from 78 degrees to 90 degrees. The angle may be obtained by adjusting the parameters for dry etching the first trench 455-1 and the second trench 455-2.

The guiding portion comprising the upper core portion 453, the lower core portion 454, the first trench 455-1, and the second trench 455-2 may be arranged to guide the electromagnetic mode launched from the first waveguide 410.

The electromagnetic mode launched from the first waveguide 410 may be increasingly concentrated around the first strip 430 as it advances in the first direction 403 within the guiding portion 450.

In some implementations, the coupling layer 460 may be integral to the lower core portion 454 and be fabricated in a single step with the lower core portion 454.

Figure 4D:
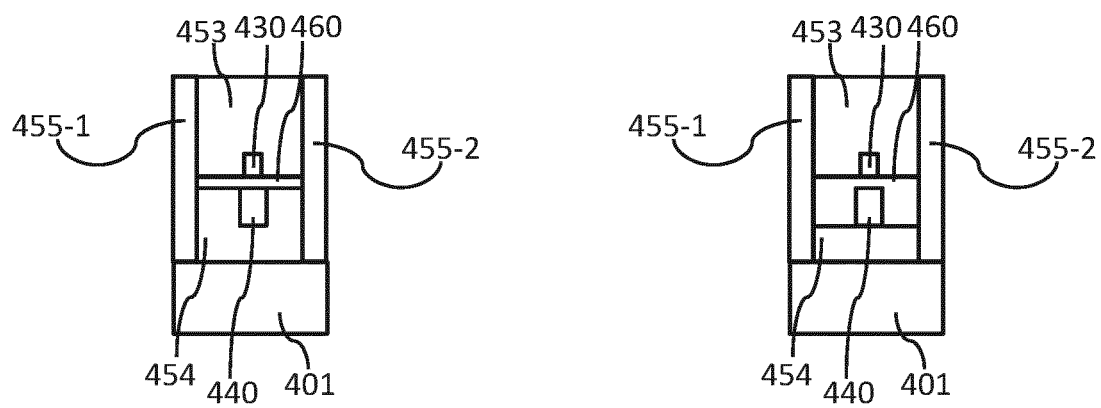

FIG. 4d is a schematic that illustrates an exemplary embodiment of the mode-size converter 400. In particular, FIG. 4d shows a cross-section view of the plane labelled 4d in FIG. 4b.

In this example, the cross-section of the second strip 440 may be a square. The cross-section of the second strip 440 may be substantially the same throughout the length of the first strip.

The cross-section area of the first strip 430 may be smaller than the cross-section area of the second strip 440.

The coupling layer 460 may be positioned between the first strip 430 and the second strip 440 such that the gap between the first strip 430 and the second strip 440 is filled by the coupling layer 460.

Depending on the method of fabrication as will be described later in FIGS. 7 and 8, the coupling layer 460 may be disposed at least in two different fashions with respect to the second strip 440. These are shown in the left panel and the right panel of FIG. 4d.

In the left panel of FIG. 4d, the coupling layer 460 is disposed such that only the top surface of the second strip 440 is in contact with the coupling layer 460. The second strip 440 may be embedded substantially in the lower core portion 454.

In the right panel of FIG. 4d, the coupling layer 460 is disposed such that only the bottom surface of the second strip 440 is in contact with the lower core portion 454. The second strip 440 may be embedded substantially in the coupling layer 460.

The dimensions of the second strip 440 may be determined considering the arrangement of the coupling layer 460 and the lower core portion 454 such that it supports the mode supported by the mode the second waveguide 420, at least at the second end 452.

The refractive index of the first strip 430 and the refractive index of the second strip 440 are larger than the refractive index of the upper core portion 453, the refractive index of the lower core portion 454, the refractive index of the coupling layer 460, the refractive index of the trenches 455-1, 455-2.

In some implementations, the refractive index of the upper core portion 453, the refractive index of the lower core portion 454, and the refractive index of the coupling layer 460 are all substantially the same.

In some implementations, the refractive index of the upper core portion 453 and the refractive index of the lower core portion 454 are smaller than the refractive index of the coupling layer 460.

The guided mode concentrated around the first strip 430 may be evanescently coupled to the second strip 440 via the coupling layer 460.

The length of the evanescent coupling region where the first strip 430 and the second strip 440 are evanescently coupled to each other may be adjusted such that the guided mode may be transferred substantially completely to the second strip 440 at the end of the coupling region.

The length of the evanescent coupling region may range from 10 μm to 1 mm.

In this example, the first strip 430 whose cross-section is assumed to be smaller than the cross-section of the second strip 440, is embedded in the upper core portion 453. However, the second strip 440 may be embedded in the upper core portion 453 and the first strip 430 may be embedded in the lower core portion 454 without substantially changing the principle of operation.

Figure 4E:
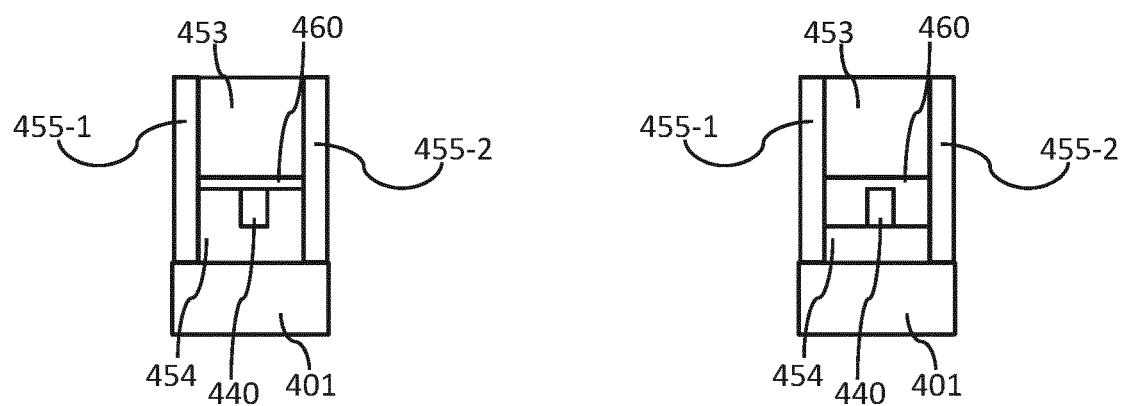

FIG. 4e is a schematic that illustrates an exemplary embodiment of the mode-size converter 400. In particular, FIG. 4e shows a cross-section view of the plane labelled 4e in FIG. 4b. As discussed in FIG. 4d, a left panel and a right panel shows two different configurations of the coupling layer 460 according to different fabrication methods which will be explained in FIGS. 7 and 8.

In a configuration shown in the left panel, the waveguide formed by the second strip 440 and the coupling layer 460 as a core and the upper core portion 453 and the lower core portion 454 as a cladding may support the propagation of a guided mode at the operation wavelength.

In a configuration shown in the right panel, the waveguide formed by the second strip 440 as a core and the coupling layer 460, the upper core portion 453 and the lower core portion 454 as a cladding may support the propagation of a guided mode at the operation wavelength.

In some implementations, the refractive index of the coupling layer 460 may be larger than the refractive index of the upper core portion 453 and the refractive index of the lower core portion 454 but smaller than the refractive index of the second strip 440. In this case, in the configuration shown in the left panel, the waveguide formed by the second strip 440 and the evanescent coupling region 460 as a core and the lower core portion 454 and the lower core portion 454 as a cladding may support the propagation of a guided mode at the operation wavelength. Such waveguide is analogous to a rib waveguide or is a graded rib waveguide.

In some implementations, the refractive index of the coupling layer 460 may be substantially the same as the refractive index of the upper core portion 453 and the refractive index of the lower core portion 454 but smaller than the refractive index of the second strip 440.

The electromagnetic mode guided by the second strip 440 may be substantially the same as the mode guided by the second waveguide 420.

In some implementations, the coupling layer 460 may be integral to the upper core portion 453 and be fabricated in a single step with the lower core portion 453.

Figure 5:
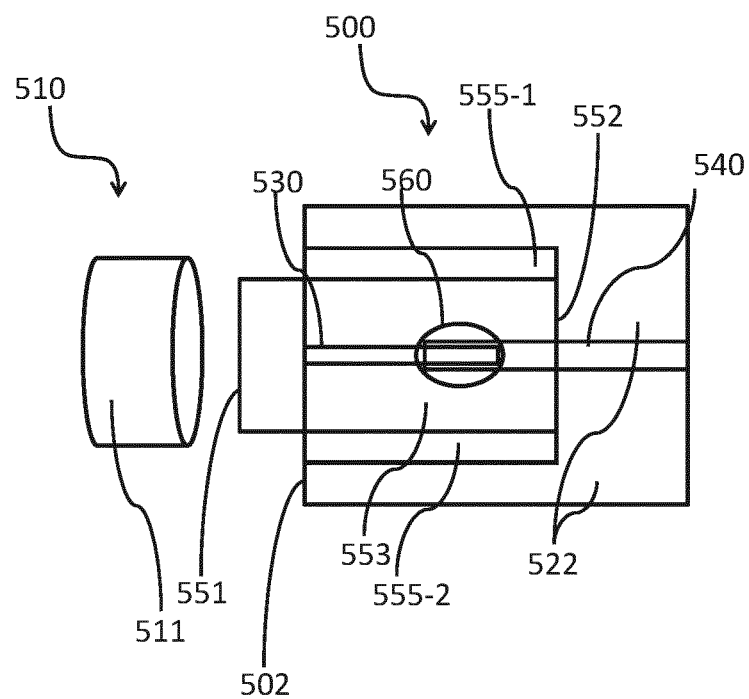
FIG. 5 is a schematic that illustrates an exemplary embodiment of a mode-size converter.

FIG. 5 is a schematic that illustrates an exemplary embodiment of the mode-size converter 500 with references to FIGS. 4a to 4e.

The mode-size converter 500 and a second waveguide 520 are formed integrally within a waveguide chip. The mode-size converter 500 may comprise a guiding portion 550, which may be fabricated as an integral part of the waveguide chip. The guiding portion 550 may further comprise includes a core portion 553 and trenches 555-1, 555-2. The mode-size converter 500 may further comprise a first strip 530 and a second strip 540. The first strip 530 and the second strip 540 are evanescently coupled to each other via a coupling layer 560. These features are as described in the example of FIGS. 4a to 4e.

The guiding portion 550 may comprise a first end 551 and a second end 552.

The first end 551 may protrude from the facet of the waveguide chip.

In some implementations, the core portion 553 may protrude from a facet 502 of the waveguide chip and the first end 551 may be formed at the surface of the core portion 553 of the guiding portion 550 nearest to a first waveguide 510, as shown in FIG. 5.

In some implementations, both the core portion 553 and the cladding portions 555-1, 555-2 may protrude from the facet 502 of the waveguide chip and the first end 551 may be formed at the surface of both the core portion 553 and the trenches 555-1, 555-2 nearest to the first waveguide 510.

The side of the first strip 530 nearest to the first end 551 may terminate at a predetermined distance from the first end 551.

In some implementations, the side of the first strip 530 nearest to the first end 551 may terminate at a position corresponding to the facet 502 of the waveguide chip.

In some implementations, the side of the first strip 530 nearest to the first end 551 may terminate at the first end 551.

The protruded part of the core portion 553 may locally form a waveguide with the protruded part of the core portion 553 as a core and air/vacuum as a cladding. This may provide a tight confinement of the mode incident from the first waveguide 510 and may lead to an improved coupling efficiency at the first end 651.

The length of protrusion may range from 5 µm to 50 µm.

Figure 6:
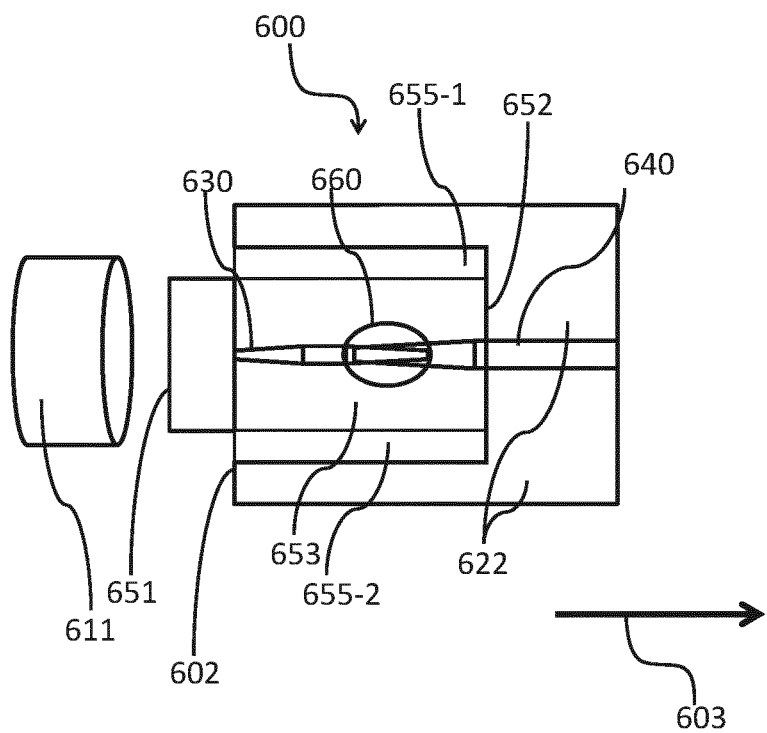
FIG. 6 is a schematic that illustrates an exemplary embodiment of a mode-size converter.

FIG. 6 is a schematic that illustrates an exemplary embodiment of the mode-size converter 600 with references to FIGS. 4a to 4e and 5.

As in the example of FIGS. 4a to 4e and 5, the mode-size converter 600 and a second waveguide 620 are formed integrally within a waveguide chip. The mode-size converter 600 may comprise a guiding portion 650, which may be fabricated as an integral part of the waveguide chip. The guiding portion 650 may further comprise includes a core portion 653 and trenches 655-1, 655-2. The guiding portion 650 may comprise a first end 651 and the second end 652. These features are as described in the examples of FIGS. 4a to 4e and FIG. 5.

The mode-size converter 600 may further comprise a first strip 630 and a second strip 640. The first strip 630 and the second strip 640 are evanescently coupled to each other via a coupling layer 660 as described in the examples of FIGS. 4a to 4e and FIG. 5.

In this example, the cross-section area of the first strip 630 and the second strip 640 may change along the lengths such that the effective index of the guided mode within the mode-size converter 600 can be further controlled.

In some implementations, the first strip 630 may comprise a first taper in which the cross-section area increases from the side nearest to the first end 651 in a first direction 603. This may decrease spurious scattering of light at the termination of the first strip 630.

In some implementations, the first strip 630 may comprise a second taper in which the cross-section area decreases in the region of evanescent coupling with the second strip 640 in the first direction 603. This may render the evanescent coupling more efficient.

In some implementations, the second strip 640 may comprise a third taper in which the cross-section area increases in the region of evanescent coupling with the first strip 630 in the first direction 603. This may render the evanescent coupling more efficient.

In this example, the thickness of the first strip 630 and the thickness of the second strip 640 are fixed and the cross-section area is changed by changing the width of the first strip 630 and the second strip 640, as shown in FIG. 6. However, the cross-section area of the first strip 630 and the second strip 640 may be changed by changing any other dimension of the cross-sections.

In some implementations, the lengths of the first taper, the second taper and the third taper, namely the length in the first direction 603 within which the cross-section area changes, may be substantially the same.

Each of the first taper, the second taper, the third taper may be optimised in the initial cross-section area, the final cross-section area and the length.

For example, the lengths of the first taper, the second taper and the third taper may be 10 μm and the width may vary from 200 nm to 1 μm when the thickness of the first strip 630 is 200 nm and the thickness of the second strip 640 is 800 nm.

The core portion 653 may protrude from the facet 602 of the waveguide. However, the concept of tapering of the first strip 630 and the second strip 640 is not conditioned on this feature and may be applied to any other configuration of the guiding portion 650. For example, the core portion 653 of the guiding portion may not protrude from the facet 602. For another example, the guiding portion 650 may not comprise trenches 655-1, 655-2.

The description of the mode-size converter 100, 200, 300, 400, 500, 600 so far was based on the electromagnetic mode incident on the first end 101, 251, 351, 451, 551 and travelling in the first direction 103, 203, 303, 403, 603. However, as explained above, the mode-size converter 100, 200, 300, 400, 500, 600 is a reciprocal device and the same design concept applies to the mode incident on the second end 102, 252, 352, 452, 552 and exits through the first end 101, 251, 351, 451, 551. The descriptions given above may be applied in a reverse order in a direction opposite to the first direction 103, 203, 303, 403, 603.

Figure 7:
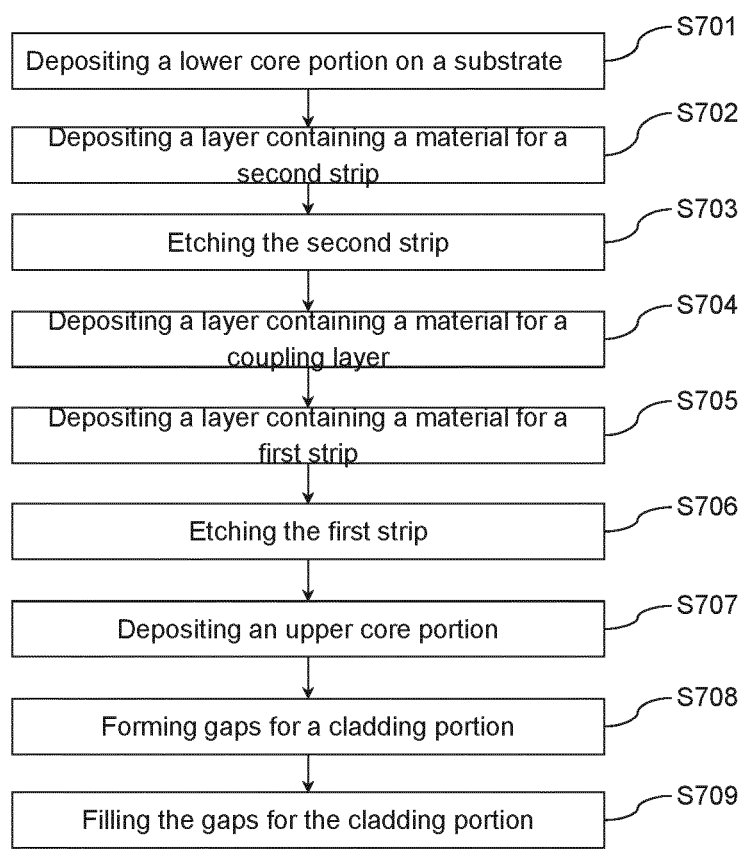
FIG. 7 is a flowchart that illustrates an exemplary embodiment of fabrication process of a mode-size converter.

FIG. 7 is a flowchart that illustrates an exemplary embodiment of fabrication process of the mode-size converter 400, 500, 600 with references to FIGS. 4a and 4d. In particular, this fabrication process is for the configurations shown in the right panels of FIGS. 4c to 4e.

In step 701, a lower core portion 454 may be deposited on the substrate 401. The lower core portion 454 may comprise a silicon dioxide ($SiO_2$). The substrate 401 may comprise a silicon wafer.

The thickness of the lower core portion 454 may be determined such that the guided mode within the guiding portion 450 and/or the second strip 440 may not be affected by the material of the substrate 401. For example, the lower core portion 454 may comprise a 8 μm thick silicon dioxide layer. This may be achieved by oxidation of the silicon substrate 401.

In step 702, a layer containing a material for the second strip 440 may be deposited. For example, a silicon nitride (SiN) film may be deposited by one or more of low pressure chemical vapour deposition (LPCVD) technique, plasma enhanced chemical vapour deposition (PECVD) technique or atomic layer deposition (ALD) technique, using a mixture of silicon-containing precursors and nitrogen-containing precursors such as $SiCl_2H_2$, $SiH_4$, $N_2$ and $NH_3$.

In step 703, the second strip 440 may be fabricated by etching the layer deposited in step 702. For example, the layer deposited in step 702 may be patterned by lithography and etching using wet etch techniques using HF-based solutions or dry etch techniques using a mixture of H- and carbon fluoride CFx radicals.

In case the second strip 440 is connected to or extends to the waveguides 420 for the photonic circuits within the waveguide chip, the waveguides 420 for the photonic circuits may be also fabricated simultaneously with the second strip 440.

In step 704, a layer containing a material for the coupling layer 460 may be deposited. For example, a layer of a hydrogenated $SiO_{1.95}N_{0.05}$:H film may be deposited by one or more of plasma-enhanced chemical vapour deposition (PECVD) technique, low pressure chemical vapour desposition (LPCVD) technique. Alternatively, a silicon oxynitride layer may be deposited first and hydrogenated by means of an H-plasma.

In step 705, a layer containing a material for the first strip 430 may be deposited. For example, a silicon nitride (SiN) film may be deposited by plasma-enhanced chemical vapour deposition (PECVD) using a mixture of silicon-containing precursors and nitrogen-containing precursors such as $SiH_4$ and $NH_3$.

In step 706, the first strip 430 may be fabricated by etching the layer deposited in step 705. For example, the layer deposited in step 705 may be patterned by lithography and etching using wet etch techniques using HF-based solutions or dry etch techniques using a mixture of H- and carbon fluoride CFx radicals.

In step 707, the upper core portion 453 may be deposited. For example, the upper core portion 453 may comprise a silicon dioxide ($SiO_2$) deposited by one or more of low pressure chemical vapour deposition (LPCVD) technique, plasma enhanced chemical vapour deposition (PECVD) technique, or atomic layer deposition (ALD) technique.

In step 708, two lateral gaps for the trenches 455-1, 455-2 may be formed. For example, this may be formed a combination of dry and wet etching sequences.

In step 709, the gaps for the trench 455-1, 455-2 may be filled. For example, the gaps may be filled with N2 gas during hermetic packaging.

For example, the refractive indices of the layers fabricated following this procedure may be as follows: $n_{430}=n_{440}=2$, $n_{460}=1.55$, $n_{453}=n_{454}=1.4$, $n_{455-1}=n_{455-1}=1$.

Figure 8:
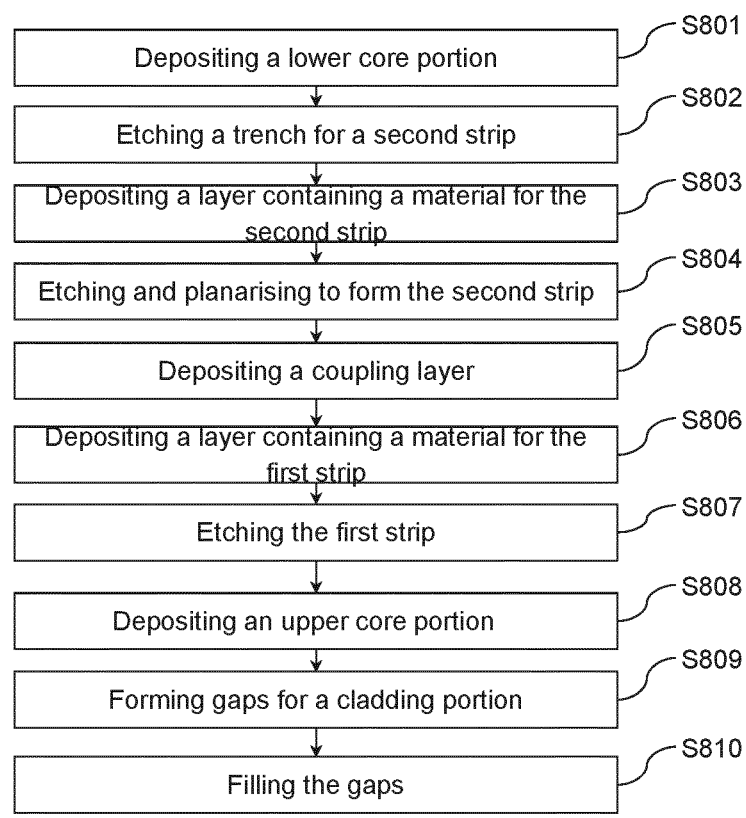
FIG. 8 is a flowchart that illustrates an exemplary embodiment of fabrication process of a mode-size converter.

FIG. 8 is a flowchart that illustrates an exemplary embodiment of fabrication process of the mode-size converter 400, 500, 600 with references to FIGS. 4a and 4d. In particular, this fabrication process is for the configurations shown in the left panels of FIGS. 4c to 4e.

In step 801, a lower core portion 454 may be deposited on the substrate 401. The lower core portion 454 may comprise a silicon dioxide ($SiO_2$). The substrate 401 may comprise a silicon wafer.

The thickness of the lower core portion 454 may be such that the guided mode within the guiding portion 450 and/or the second strip 440 may not be affected by the material of the substrate 401. For example, the lower core portion 454 may comprise a 8 μm thick silicon dioxide layer. This may be achieved by oxidation of the silicon substrate 401.

In step 802, a trench for the second strip 440 may be fabricated on the lower core portion 454. For example, the trench may be fabricated by etching the lower core portion 454 using dry etching techniques such as inductively coupled plasma (ICP), reactive ion etching (RIE) and wet etching.

The depth of the trench may be at least the thickness of the second strip 440.

In step 803, a layer containing a material for the second strip 440 may be deposited. For example, a silicon nitride (SiN) film may be deposited by one or more of plasma-enhanced chemical vapour deposition (PECVD), low pressure chemical vapour deposition (LPCVD) technique, or atomic layer deposition (ALD) technique using a mixture of silicon-containing precursors and nitrogen-containing precursors such as $SiCl_2H_2$, $SiH_4$, $N_2$ and $NH_3$.

The thickness of the layer may be larger than the depth of the trench such that the trench formed in step 802 is completely filled by the material for the second strip 440. For example, the thickness of the silicon nitride film may range from 800 nm to 3 μm.

In step 804, the layer formed in step 803 may be etched and planarised to define the second strip 440. For example, the silicon nitride layer formed in step 803 may be etched by the dry etching techniques until the top surface of the lower core portion 454 is exposed. Alternatively, the silicon nitride layer formed in step 803 may be etched by dry etching techniques subsequently followed by the chemical mechanical polishing (CMP) techniques until the top surface of the lower core portion 454 is exposed.

In case the depth of the trench was set to be larger than the required thickness of the second strip 440 in step 802, the lower core portion 454 may also be etched in this step accordingly.

In step 805, the coupling layer 460 may be deposited. For example, a layer of silicon oxynitride may be deposited by the chemical vapour deposition techniques at least three precursors gases, typically $SiCl_2H_2$ or $SiH_4$ as Si precursor, $NH_3$ or $N_2$ as N precursor and $O_2$ or $N_2O$ as oxygen precursor.

In a preferred implementation, the refractive index of the coupling layer 460 may be 1.65.

In some implementations, the refractive index of the coupling layer may range from 1.55 to 1.97.

The thickness of the coupling layer 460 may range from 10 nm to 400 nm when the operating wavelength is 1550 nm.

In step 806, a layer containing a material for the first strip 430 may be deposited. For example, a silicon nitride (SiN) film may be deposited by plasma-enhanced chemical vapour deposition (PECVD) technique or by atomic layer deposition (ALD) technique using a mixture of silicon-containing precursors and nitrogen-containing precursors such as $SiCl_2H_2$, $SiH_4$, $N_2$ and $NH_3$.

In step 807, the second strip 430 may be fabricated by etching the layer deposited in step 806. For example, the layer deposited in step 806 may be patterned by lithography and etching using wet etch techniques using HF-based solutions or dry etch techniques using a mixture of H- and carbon fluoride CFx radicals.

In step 808, the upper core portion 453 may be deposited. For example, the upper core portion 453 may comprise a silicon dioxide ($SiO_2$) deposited by one or more of low pressure chemical vapour deposition (LPCVD) technique, plasma enhanced vapour deposition (PECVD) technique, or atomic layer deposition (ALD) technique using Si, N and O precursors or liquid precursors.

For example, the refractive index of the upper core portion 453 may range from 1.4 to 1.7 but be lower than or equal to the refractive index of the coupling layer 460.

In step 809, two lateral gaps for the trenchs 455-1, 455-2 may be formed. For example, this may be formed a combination of dry and wet etching sequences.

In step 810, the gaps for the trench 455-1, 455-2 may be filled. For example, the gaps may be filled by depositing a highly porous silicon dioxide by chemical vapour deposition techniques.

The refractive index of the first trench 455-1, and the second trench 455-2 may be lower than the refractive index of the stoichiometric silicon dioxide, for example, 1.05.

For example, the refractive indices of the layers fabricated following this procedure may be as follows: $n_{430}=n_{440}=2$, $n_{460}=1.65$, $n_{453}=n_{454}=1.4$, $n_{455-1}=n_{455-1}=1.05$.

In the fabrication processes described above in FIGS. 7 and 8, the first strip 430, the second strip 440, and the coupling layer 460 may be fabricated to be a silicon oxynitride layer.

In some implementations, the silicon oxynitride layer may comprise a hydrogenated silicon oxynitride $Si_xO_yN_z$:H, wherein $1 \leq x \leq 2$, $0 < y \leq 2$, $0 < z \leq 4$, such that the refractive index of the first strip is between 1.55 and 3.7.

In some implementations, the silicon oxynitride layer may comprise a hydrogen-free silicon oxynitride $Si_xO_yN_z$, wherein $1 \leq x \leq 2$, $0 < y \leq 2$, $0 < z \leq 4$, such that the refractive index of the first strip is between 1.55 and 3.7.

The embodiments of the invention shown in the drawings and described above are exemplary embodiments only and are not intended to limit the scope of the invention, which is defined by the claims hereafter. It is intended that any combination of non-mutually exclusive features described herein are within the scope of the present invention.

The invention claimed is:

1. An optical mode-size converter, comprising:
    a guiding portion, wherein at least a portion of the guiding portion extends between a first end and a second end along a first path;
    a first strip with a first refractive index; and
    a second strip with a second refractive index,
    wherein the first strip and the second strip are embedded within the guiding portion extending along the first path such that a first optical mode received at the first end reaches the first strip before the second strip and such that the second strip extends to the second end,
    wherein the first refractive index and the second refractive index are higher than a refractive index of the guiding portion,
    wherein a cross section area of the first strip is smaller than a cross section area of the second strip,
    wherein a section of the first strip and a section of the second strip overlap to form an evanescent coupling region, such that the converter is responsive to a first optical mode received at the first end to convert the first optical mode into a second optical mode with a smaller mode size along the first path towards the second end,
    wherein the optical mode-size converter further comprises a coupling layer disposed between the first strip and the second strip within the evanescent coupling region, wherein the refractive index of the coupling layer is larger than the refractive index of the guiding portion and smaller than the first refractive index and the second refractive index,
    wherein a cross-section of the first strip, along the first path towards the second end, gradually increases in a first region, remains the same in a second region and gradually decreases in a third region,
    wherein the third region comprises a portion of the first strip overlapped with a portion of the second strip, and
    wherein a cross-section area of the portion of the second strip overlapped with the portion of the first strip gradually increases along the first path towards the second end.

2. An optical mode-size converter of claim 1, wherein a thickness of the coupling layer ranges from 10 nm to 400 nm.

3. An optical mode-size converter of claim 1, wherein the first strip is elongate along the first path and comprises a first facet and a second facet perpendicular to the first path, wherein the first facet is closer to the first end than the second facet, and wherein the second strip is elongate along the first path and comprises a first facet within the guiding portion.

4. An optical mode-size converter of claim 3,
wherein a first end of the first strip is closer to the first end than a first end of the second strip, and
wherein the evanescent coupling region is formed between the first facet of the second strip and the second facet of the first strip.

5. An optical mode-size converter of claim 3,
wherein the first strip terminates at the first end such that the first facet of the first strip is at the first end.

6. An optical mode-size converter of claim 3,
wherein the first facet of the first strip is at a predetermined distance from the first end.

7. An optical mode-size converter of claim 1,
wherein a cross-section area of the second strip in the evanescent coupling region gradually increases along the first path towards the second end.

8. An optical mode-size converter of claim 7,
wherein a width of the second strip varies from 10 nm to 2 µm when the thickness of the second strip is between 200 nm to 2 µm over a length ranging from 10 µm to 1 mm.

9. An optical mode-size converter of claim 1,
wherein a width of the first strip varies from 10 nm to 2 µm when the thickness of the first strip is between 100 nm and 400 nm over a length ranging from 10 µm to 1 mm.

10. An optical mode-size converter of claim 1,
wherein a length of the first region and the third region ranges from 10 µm to 1 mm,
wherein a width of the first region and the third region ranges from 10 nm to 300 nm when the thickness of the first strip is between 100 nm and 400 nm, and
wherein a width of the second region ranges from 500 nm to 3 µm.

11. An optical mode-size converter of claim 1,
wherein a waveguide formed by the first strip as a core and the guiding portion as a cladding is below a cutoff condition at an operating wavelength.

12. An optical mode-size converter of claim 1,
wherein the guiding portion is arranged to support the propagation of the first optical mode from the first end to the second end.

13. An optical mode-size converter of claim 1,
wherein the second refractive index is substantially identical to a refractive index of a core of a waveguide connected to the second end and arranged to support the second optical mode exiting the optical mode-size converter.

14. An optical mode-size converter of claim 13,
wherein the refractive index of the guiding portion is substantially identical to a refractive index of a cladding of the waveguide.

15. An optical mode-size converter of claim 1,
wherein the first refractive index and the second refractive index are substantially identical.

16. A waveguide chip connectable to an optical fiber, comprising:
an optical mode-size converter according to any preceding claim;
a waveguide;
wherein the first end is a facet of the waveguide chip and the second end is within the waveguide chip,
wherein the first end is arranged to receive from a light from the optical fiber supporting the first optical mode,
wherein the waveguide is arranged to support the second optical mode and connected to the second strip at the second end.

17. A waveguide chip of claim 16,
wherein the first end is arranged to receive light from the optical fiber when a cleaved facet of the optical fiber is butt-coupled to the first end.

18. A waveguide chip of claim 16,
wherein the guiding portion comprises:
a core portion; and
at least one trench,
wherein the refractive index of the core portion is higher than the refractive index of the at least trench.

19. A waveguide chip of claim 18,
wherein the at least one trench comprises two slabs which delimit two opposite sides of the guiding portion.

20. A waveguide chip of claim 16,
wherein the second refractive index is substantially identical to a refractive index of a core of the waveguide, and
wherein the cross section of the second strip is substantially identical to the cross section of the core of the waveguide at the second end.

21. A photonic integrated system, comprising:
a plurality of waveguides,
wherein at least two of the plurality of waveguides are interconnected by the mode-size converter according to claim 1.

22. A photonic integrated system, comprising:
a waveguide chip according to claim 16.

* * * * *